United States Patent
Mankovskii et al.

(10) Patent No.: US 9,467,466 B2
(45) Date of Patent: Oct. 11, 2016

(54) CERTIFICATION OF CORRECT BEHAVIOR OF CLOUD SERVICES USING SHADOW RANK

(71) Applicant: CA, Inc., Islandia, NY (US)

(72) Inventors: Serguei Mankovskii, Morgan Hill, CA (US); Steven L. Greenspan, Scotch Plains, NJ (US); Peter Brian Matthews, Berkhamsted (GB)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/529,281

(22) Filed: Oct. 31, 2014

(65) Prior Publication Data

US 2016/0127407 A1 May 5, 2016

(51) Int. Cl.
*H04L 29/06* (2006.01)

(52) U.S. Cl.
CPC ........... *H04L 63/1433* (2013.01); *H04L 63/20* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 6,502,022 B1 * | 12/2002 | Chastain | G01C 21/26 701/36 |
| 7,752,125 B1 * | 7/2010 | Kothari | G06Q 20/10 705/38 |
| 9,154,516 B1 * | 10/2015 | Vaystikh | H04L 63/1425 |

OTHER PUBLICATIONS

Kupiec, Paul H. "Techniques for verifying the accuracy of risk measurement models." The J. of Derivatives 3.2 (1995).*
Klinke, Andreas, and Ortwin Renn. "A new approach to risk evaluation and management: Risk-based, precaution-based, and discourse-based strategies." Risk analysis 22.6 (2002): 1071-1094.*

* cited by examiner

*Primary Examiner* — Shawnchoy Rahman
(74) *Attorney, Agent, or Firm* — Stevens & Showalter, LLP

(57) ABSTRACT

Determining potential harm associated with a network endpoint external to an enterprise includes receiving information about a network-based communication by a resource of the enterprise directed to the network endpoint external to the enterprise, and calculating a plurality of individual scores related to a risk associated with the network-based communication, wherein each individual score corresponds to a different category of risk. The determination also includes receiving data specifying a policy related to rules defined by the enterprise regarding usage of cloud services; calculating a composite risk score related to the network-based communication, wherein the composite risk score is based on the individual scores and the policy; and notifying an entity of the enterprise about the composite risk score.

19 Claims, 4 Drawing Sheets

CERTIFICATION OF CORRECT BEHAVIOR OF CLOUD SERVICES USING SHADOW RANK

BACKGROUND

The present disclosure relates to computer resource usage and, more specifically, to analyzing network traffic.

Cloud computing providers offer their services according to several fundamental models: infrastructure as a service (IaaS), platform as a service (PaaS), and software as a service (SaaS) where IaaS is the most basic and each higher model abstracts from the details of the lower models. In the most basic cloud-service model, providers of IaaS offer computers—physical or virtual machines—and other resources.

For example, a hypervisor can run various virtual machines as guests and pools of hypervisors within the cloud operational support-system can support large numbers of virtual machines and the ability to scale services up and down according to customers' varying requirements. IaaS clouds often offer additional resources such as a virtual-machine disk image library, raw block storage, and file or object storage, firewalls, load balancers, IP addresses, virtual local area networks (VLANs), and software bundles. IaaS-cloud providers supply these resources on-demand from their large pools installed in data centers.

To deploy their applications, cloud users install operating-system images and their application software on the cloud infrastructure. In this model, the cloud user patches and maintains the operating systems and the application software. Cloud providers typically bill services (e.g., IaaS, SaaS, etc.) on a utility computing basis wherein the cost reflects the amount of resources allocated and consumed.

As cloud service usage grows in many business and enterprises, these organizations may benefit from identifying how much and how often cloud services are being utilized by personnel within the organization. In particular, fraud, phishing and malware are migrating to cloud service platforms such as SaaS and different enterprises may have different tolerance levels about individuals visiting potentially problematic sites.

BRIEF SUMMARY

According to one aspect of the present disclosure, a method of determining potential harm associated with a network endpoint external to an enterprise includes receiving information about a network-based communication by a resource of the enterprise directed to the network endpoint external to the enterprise, and calculating a plurality of individual scores related to a risk associated with the network-based communication, wherein each individual score corresponds to a different category of risk. The method also includes receiving data specifying a policy related to rules defined by the enterprise regarding usage of cloud services; calculating a composite risk score related to the network-based communication, wherein the composite risk score is based on the individual scores and the policy; and notifying an entity of the enterprise about the composite risk score.

According to another aspect of the present disclosure, a system for determining potential harm associated with a network endpoint external to an enterprise includes a memory storage device and a processor configured to execute instructions stored in the memory storage device. The instructions when executed by the processor cause the system to: receive information about a network-based communication by a resource of the enterprise directed to the network endpoint external to the enterprise, and calculate a plurality of individual scores related to a risk associated with the network-based communication, wherein each individual score corresponds to a different category of risk. The instructions when executed by the processor cause the system to: receive data specifying a policy related to rules defined by the enterprise regarding usage of cloud services; calculate a composite risk score related to the network-based communication, wherein the composite risk score is based on the individual scores and the policy; and notify an entity of the enterprise about the composite risk score.

According to another aspect of the present disclosure, a computer program product for determining potential harm associated with a network endpoint external to an enterprise includes a non-transitory computer readable storage medium having computer readable program code embodied therewith. The computer readable program code includes computer readable program code for receiving information about a network-based communication by a resource of the enterprise directed to the network endpoint external to the enterprise, and computer readable program code for calculating a plurality of individual scores related to a risk associated with the network-based communication, wherein each individual score corresponds to a different category of risk. The program code also includes computer readable program code for receiving a policy related to rules defined by the enterprise regarding usage of cloud services, and computer readable program code for calculating a composite risk score related to the network-based communication, wherein the composite risk score is based on the individual scores and the policy. Additionally, the program code includes computer readable program code for notifying an entity of the enterprise about the composite risk score.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
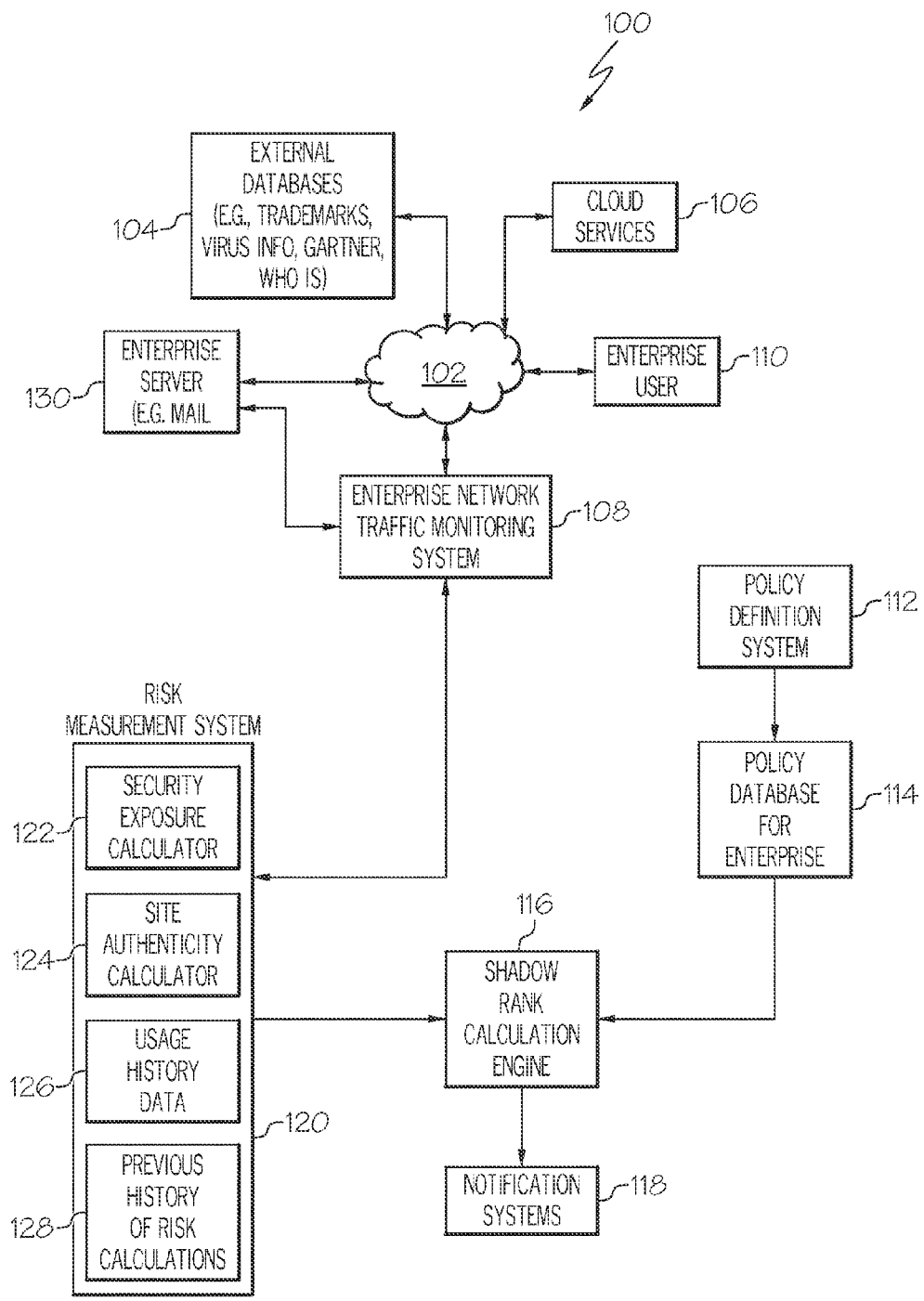
FIG. 1 illustrates an example computing environment in which a risk measurement framework can be deployed in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or by combining software and hardware implementation that may all generally be referred to herein as a "circuit," " module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read -only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In accordance with the principles of the present disclosure, an enterprise can manage the risks associated with using cloud services such as, for example, SaaS services. A composite "score", or "rank", or "value" can be calculated that quantifies risks associated with using an SaaS service by combining together individual determinations about such factors as: web site reputation, SaaS reputation, network traffic analysis and enterprise policies. In this way a comprehensive, but easy to understand, ranking system can be established to be used by executive-level leadership for monitoring compliance with policies about usage of SaaS services in the enterprise.

As used herein a "shadow rank" reflects the degree of possible harm that could be inflicted on a business or enterprise in case an employee or other enterprise entity engages with a particular web site, cloud service provider, or SaaS. One example shadow rank could be expressed as three categories of risk: "low", "medium", and "high". The shadow rank could also include a probability associated with a certainty of the accuracy of categorization. Another shadow rank could be expressed as a Boolean-type value such as "Approved / non-Approved".

As will be described in more detail below, the "rank" or "shadow rank" can be computed in several steps. First, a plurality of different "scores" or "measurements" are calculated wherein each individual score corresponds to a different category of risk. Example individual scores can relate, for example, to a probability of security exposure, a probability of the authenticity of a (uniform resource identifier) URI, an amount of usage of a particular URI from within the enterprise, existence of previous knowledge about a cloud service within the enterprise and previous approval of usage of a particular cloud service. One of ordinary skill will readily recognize that other individual scores or measurements related to other security-related, or risk, categories may be utilized as well. The individual scores can be assembled into an ensemble score comprised of the plurality of individual scores.

A shadow rank engine can be a rule-based system that uses rules contained in a policy database. The contents of the policy database can be unique to every enterprise to reflect the nature of that enterprise's business and their tolerance to risk. For example, companies that produce antivirus software might consider highly unsecure site safe for business and have policies that, when applied, rank such sites as "low risk" (e.g., communication with these sites is allowed). However, a company that is highly concerned with data leaks might consider all off-site cloud data storage services harmful to business. Thus, for these companies, trustworthy and authentic sites may still be categorized as "high" risk because of that company's rules in their policy database. Accordingly, the "shadow rank" can identify the fitness of a SaaS or cloud service against policies and business practices of an enterprise. The same service would have the same ensemble score (i.e., it would have the same individual scores for the plurality of different types of risk measurements that are evaluated using the policy database). However, after application of the enterprise policies by the shadow rank engine to that ensemble score, that same service would have a different, respective shadow rank for each enterprise because the shadow rank engine also takes into account the rules and policies defined and imposed in that enterprise's policy database when calculating the shadow rank based on those individual scores or values that make up the ensemble score. In other words, the shadow rank value is based on both the individual risk-related scores as well as the enterprise policies defined by the enterprise in their policy database.

In the description below, the "shadow rank" can be referred to in relative terms such as "high" or "low". This terminology is not meant to restrict the concept of a shadow rank value as being a numerical value higher than, or lower than, some other value. Rather, those relative terms are meant to convey that a probability of potential harm associated with a particular URI may be estimated to be higher, or lower, that that of another URI.

FIG. 1 illustrates an example computing environment in which a risk measurement framework can be deployed in accordance with the principles of the present disclosure. In the environment 100 an enterprise user 110 uses a network 102 to communicate with a variety of network endpoints that are external to the enterprise. One such example endpoint can be a cloud service provider 106 that provides cloud services such as, for example, SaaS. An enterprise typically includes a network traffic monitoring system 108 that is shown as a single element in FIG. 1. In practice, the monitoring system 108 can be distributed at different locations within the enterprise to monitor network traffic in either direction. One aspect of such monitoring systems 108 relates to threat detection, intrusion detection and the presence of malware or viruses within the enterprise network. Certain network attacks and security-related events have "signatures" that can be autonomously detected, analyzed, evaluated, and ranked. In this way, modern enterprise network monitoring systems 108 can detect network-based communications into or out of the enterprise network, categorize them based on a number of attributes such as originator IP address, destination IP address, network protocol, application-layer protocol, destination URI, etc. and possibly associate them with currently occurring, or previously occurring, security-related events or activity. As described more fully below, the capability of such network traffic monitoring systems can be utilized when calculating a shadow rank value in accordance with the principles of the present disclosure.

In addition to the network traffic monitoring system 108, the enterprise can include other servers such as, for example, a mail server 130. Both incoming and outgoing email, messaging, or the like can be funneled through the server 130. Accordingly, the mail server, for example, can evaluate email messages according to known techniques to identify whether a message appears to be spam, whether a message appears to a phishing attempt, whether the message appears authentic (e.g., it has a message-header chain that appears to validate the sender's identity is authentic), or whether a message appears to include malware. Such analysis and categorization of email can occur based on internal information stored locally on the mail server 130 (or some other enterprise computer) or based on an external database or service that maintains current data to assist in evaluating email messages in this manner.

The framework 100 of FIG. 1 also includes external databases of information relevant to risks of various URIs and service providers. For example, the United States Patent and Trademark Office (USPTO) maintains a database of registered trademarks. If a network communication between an enterprise entity and an external network endpoint uses a URI that matches a registered trademark exactly, then the probability of that URI being authentically associated with the owner of that trademark is relatively high. URIs that include slight variations of a registered trademark may simply be common misspellings of the trademark that the owner has also secured or could, possibly, be a malicious site meant to confuse unwary users. Thus, the USPTO database can be a source of information for analyzing URIs in a network communication involving an enterprise user 110 to help estimate their authenticity.

Other databases exist as well that can be used. The WHOIS database, for example, can be used similar to the USPTO database to investigate whether the URI registration records suggest a URI is authentic or if there are potential uncertainty about its authenticity. The WHOIS database can also be used to determine which domain names are registered to which companies. Thus, an email message purportedly from Chase Bank but having no internal hyperlinks to a URI registered by Chase Bank in the text of the message would likely be considered non-authentic (or high risk). These external databases 104 can also include blogs, industry lists (e.g., lists from Gartner, Inc.), and other security-related sites that already compile information about various web sites, computer threats and cloud service providers. For example, sites maintained by Kapersky, Symantec and the U.S. Computer Emergency Readiness Team can be accessed to identify current information about malware, viruses, web site reputation, and cloud service reputation without the enterprise necessarily determining all of that information internally. For example, AVG Threat Labs can be accessed to make an initial determination about the security of a particular web site and, then, this initial determination can be modified or adjusted based on particular statistics or history that the enterprise has had with that web site.

The framework 100 of FIG. 100 also includes a risk measurement system 120 that, as mentioned above, calculates a plurality of different values or scores associated with different categories of risk. The risk measurement system 120 receives information from the traffic monitoring system 108, the other enterprise servers 130, and potentially the external databases 104. The example risk categories shown in FIG. 1 are provided merely by way of example and one of ordinary skill will recognize that fewer, or more, categories of risk are contemplated within the scope of the present disclosure.

A security exposure calculator 122 can, for example, calculate a value indicative of the probability of various types of security-related exposures associated with a particular network communication with a service provider or a particular URI or site. Different security exposures can include, for example, probability of data exposure, probability of virus attack, and probability of a phishing attack. For example, using gmail as the enterprise mail system or storing data in cloud storage inherently include a risk of data exposure. Based on the reputation of a URI or known data leaks in the past, the security exposure calculator 122 can assign an initial probability value, or adjust a probability value, (e.g., a value between 0 and 1) that a data communication with a particular endpoint has a data exposure risk. The security exposure calculator 122 can also assign a similar probability value for each of the risk of a virus attack and the risk of a phishing attack. Again, the initial value may be based on an external data source such as AVG Threat Labs or, for example, by collecting sentiments about a company or service through social media analytics, and then adjusted based on past experience and activity captured by the enterprise's traffic monitoring system 108. Each of the three different security exposure risks can be treated separately or can be combined into a single security exposure value. For example, the three values could be averaged together but that might "hide" a very serious data exposure risk if the risks of a virus attack and phishing attack are very low. Thus, another way to compute a security exposure risk value is to assign it to be the highest value of the three separate component values. There can also be a "weighting" system utilized with the three (or more) separate components where a respective weight can be assigned for each component or assigned to the internal elements that are part of calculating a component. For example, if a system being monitored only reads information, then a virus attack would have a higher relative importance than a phishing attack because that system only reads and does not respond to requests. Accordingly, a risk associated with a phishing attack could be weighted to reduce its effect on the overall score being viewed as a high risk and a risk associated with a virus attack could be weighted to increase its effect on the overall score being viewed as a high risk.

In the above description, the value of a particular measurement or calculation was described as being a probability between 0 and 1. One of ordinary skill will recognize that this is merely one way to assign relative scores to a measurement. A measurement, for example, could be a Boolean value such as "no virus risk/a virus risk" or can be measured on a scale of, for example, 1 to 10 rather than between 0 and 1. Thus, in the above description and the description that follows, any specific score range or structure is provided merely by way of example to aid in understanding the principles of the present disclosure.

The risk measurement system 120 can also include a site authenticity calculator 124 that determine a probability value that a site is authentic (e.g., owned and maintained by the organization most individuals would associate with the URI). As mentioned above, the site authenticity calculator 124 can use the WHOIS or the USPTO database can be used to determine whether a URI exactly matches a registered name or is slightly different. Conventional text-matching algorithms can be used, for example, to determine how much a URI may deviate from a registered name. For example, a URI having an exact match to a registered name can be assigned a probability value substantially equal to "1" that it is authentic. When a URI has a large deviation (e.g., greater than 20%) from one or more registered names, then it can be assigned a relatively neutral probability (e.g., between 0.4 and 0.6) because it does not appear to be intentionally causing confusion. However, when a URI deviates only slightly (e.g. 1% to 5%) from one or more registered names, then it can be assigned a relatively low probability value (e.g., 0.05-0.2) that it is authentic.

Internal databases can be maintained by the site authenticity calculator 124 that also aid in assigning a value as well. For example, a service provider can provide correct URI patterns and/or definitions for accessing their services and this information can be stored by the risk measurement system 120 as usage history data 126. When a network communication is detected that references a URI exactly matching one of the stored URI patterns, then there is a strong possibility that the URI is authentic. However, slight deviations will once again raise uncertainty that the URI in that particular communication actually references an authentic site.

The usage history data 126 can also include information not necessarily provided by a service provider but that is collected by monitoring network traffic. For example, a historical database of communications between a service provider and enterprise users can reveal clusters of URIs associated with that particular service provider. Communication with that service provider that use URIs outside of any clusters, or that are rarely used with that service provider, may be given a lower score of authenticity that URIs that match a URI in previously detected clusters. At an additional level of granularity, the usage history data 126 can include a "footprint" or "signature" of how enterprise users typically interact with a particular service or URI. The number of transactions per unit of time, the order of commands, the number of login attempts, the amount of data uploaded, the amount of data downloaded, the files or directories typically accessed can all be used to describe a "typical" or "normal" interaction with a service provider or URI. Communications that fall outside of that footprint may indicate that an enterprise resource, or a resource of the service provider, has been compromised and is involved in a data breach or some other malicious activity.

The usage history data 126 can also be used to determine a score that is indicative of the amount of use of a site within the enterprise. The "amount of use" can be calculated in a variety of different ways. For example, it could be a raw number such as, for example, 100 different enterprise entities have used that URI in the past 6 months, or it could be a relative number such as, for example, what percentage of the enterprise cloud storage data (e.g., 45%) is handled by this service provider. Based on this value, a risk value can be assigned by the risk measurement system 120 that is indicative of the past use of a particular URI by the enterprise. For example, past use of a URI and internal knowledge that data or other security has not been compromised can result in a score that indicates the URI is trustworthy. In comparison, a rarely used service provider, regardless of any information about possible data breaches, can be assigned a score that indicates the URI is neutral or untrustworthy. Also, calculation of security exposure can include an evaluation of how much of the network traffic across the enterprise is associated with a particular company or service. In cases where a predicted risk for an individual transaction may be relatively low, the perceived risk may actually be higher if those types of transactions account for a large amount of the enterprise's traffic.

The usage history data 126 can also include information generated by the enterprise which explicitly approves or forbids particular sites, URIs, or service providers. The risk measurement system 120 can, thus, produce a Boolean value indicative of whether or not a particular has been approved or not. One alternative variation is a determination whether or not a particular URI has been explicitly forbidden or not. Having both types of lists allows more robust values such as: assign one value if a URI is on the approved list, assign a second value if the URI is on the forbidden list, and assign a third value if the URI is on neither list.

Along with the usage history data 126, historical data regarding the specific risk values assigned to a URI can be maintained as well. When a communication involving a particular URI is detected, then the various risk calculations do not have to be repeated if they have recently been performed. Timestamp information associated with risk calculations for a URI can be used to determine whether or not new calculations should be performed. The different risk values (e.g., security exposure, site authenticity, enterprise usage, previous site approval, etc.) can each have different "ages" before new calculations should be performed. For example, the risk measurement system 120 may determine that previous site approval that is less than a month old is likely accurate whereas a measurement related to the probability of virus attack may be updated daily. The status and condition of the enterprise network may also play a role in whether or not to perform the risk calculations. For example, if the traffic monitoring system 108 determines a malware attack seems to be occurring or an intrusion has occurred into the enterprise network, then the risk measurement system 120 can be alerted to this condition and adjust its operation so as to calculate certain risk values each time a communication with a particular URI, or any communication at all, is detected.

The framework 100 also includes a policy definition system 112 that allows an appropriate individual, or team of individuals, to generate as policy database 114 for the enterprise. The policy definition system 112 and policy database 114 can be implemented in a variety of ways without departing from the scope of the present disclosure. In general, the policy definition system 112 provides an interface to the user that allows entry of rules and guideline on how to analyze the risk values from the risk measurement system 120. As used herein, a "policy" includes a number of related "rules". One or more policies can be defined for inclusion in the policy database 114. One example system can relate to a conventional expert system that defines a number of rules, directions on how to apply those rules, and an indication of the "weight" of a rule. For example, some rules may have more influence on a calculated outcome than other rules. Also, the "weight" of rule can be dynamically defined using the policy definition system 112 so that how a particular rule is applied can depend on the earlier determinations about other rules in the policy database. A decision vector, or decision tree, is one example logical construct of how rules can be defined and stored in the policy database 114.

A number of examples of rules are described herein to aid in understanding the conceptual model of a rule described above. However, the type and arrangement of different rules can vary greatly and are not intended to be limited to only the example rules provided herein. Because at least some of the individual risk values can vary on a spectrum between 0 and 1, different rules can be defined based on where on that spectrum a value lies. Thus, a rule is not necessarily limited to "if a site is authentic, then do X" but rather "if the probability of authenticity of a site is between 0.5 and 0.6 then do X, but if is greater than 0.9, then do Y; else then do Z". Thus, the rules can define complex decision vectors that can include many nodes and braches. One relatively simple example rule could be that any communication that has any endpoint with a URI not on the approved list is "high risk".

An alternative rule might be that any communication with an endpoint that has a URI not on the rejected list is "low risk". The rules can be used in combination (regardless of order) such as a URI having a probability of authenticity of less than 50% and a low value for an amount of previous usage within the enterprise is considered "high risk". The order of the rules can be specified such that, for example, if the probability of data exposure is over 70%, then determine if the URI footprint is an outlier or not. If it is an outlier, then the communication is "high risk"; if it is not an outlier, then the communication is "low risk".

Rules for using the different risk categories in different ways may be defined. For example, a rule may specify that the probability of authenticity may be the sole determining factor of whether a communication is "high risk" or "low risk" and that it is the probability of security exposure that is used to determine that potential accuracy of the categorization. As an example, a probability of authenticity of 0.3 may be considered "high risk" and when coupled with a probability of security exposure of 0.7 the rule is used to determine that the probability that the communication is actually "high risk" is 0.9.

One of ordinary skill will recognize that rules that address various permutations of combinations of the different risk categories can be defined in such a way to align with an enterprise's tolerance to risk and, more particularly, align with their tolerance to some types of risk rather than other types of risk. In particular, guidelines related to usage of cloud services of the enterprise are relied upon when using the policy definition system 112 to create data specifying, or implementing, policies defined by the rules about evaluating communications with network endpoints The shadow rank calculation engine 116 receives the risk values from the risk measurement system 120 and applies the rules from the policy database 114 to calculate a shadow rank for a particular URI or a particular network communication with a URI. While various and complex forms of a shadow rank can be envisioned, simplifying the value into categories of "high", "medium", or "low" risk (and possibly a probability indicative of the accuracy of categorization) is beneficial. Once the shadow rank calculation engine calculates the rank, that value can be forwarded using various notification systems 118 within the enterprise to one or more enterprise entities. For example, an e-mail reading client can provide a pop-up window on the enterprise user's computer informing them of a shadow rank of an e-mail message or can appear when a user hovers over a hyperlink in an e-mail client or web browser. The notification revealing the shadow rank can also be provided to the traffic monitoring system 108 so that statistics can be collected about communications with cloud service providers. From these statistics, further analysis can be made as to whether, or how well, enterprise policies and guidelines about allowed and forbidden communications are being followed. In certain instances, an intended network communication may have such a high risk of harm that some other system of the enterprise (e.g., firewall, etc.) can be alerted so as to block that communication. However, that functionality may typically be performed at a site-level (e.g., all communications to/from a particular site are blocked) rather than at a specific communication level (e.g., one user, but not other users of the enterprise, are blocked from communicating with a particular site).

Figure 2:
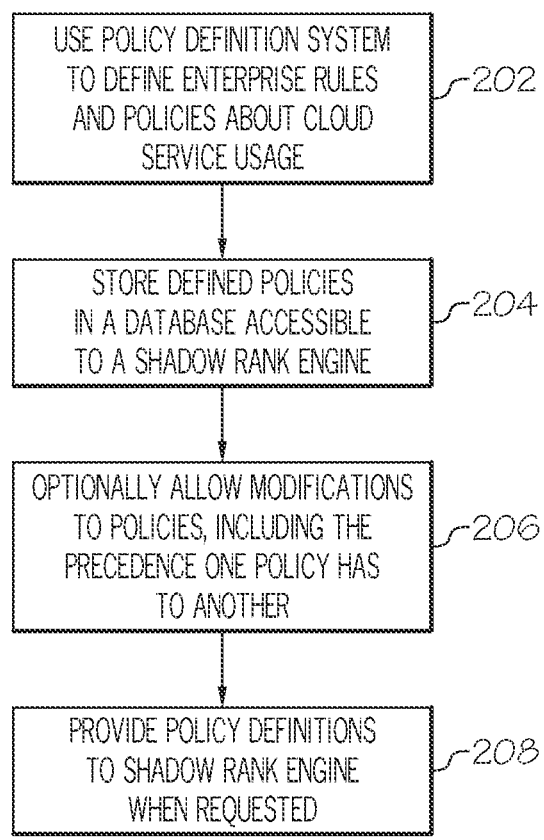
FIG. 2 illustrates a flowchart of defining enterprise rules and policies about cloud usage in accordance with the principles of the present disclosure.

FIG. 2 illustrates a flowchart of defining enterprise rules and policies about cloud usage in accordance with the principles of the present disclosure. In step 202, one or more individuals, who are familiar with the guidelines of the enterprise with respect to cloud service usage or other risks, use the policy definition system to define enterprise rules and policies that will be applied by the shadow rank calculation engine. These defined policies are stored, in step 204, in a database that is accessible to the shadow rank calculation engine.

As data is collected by an enterprise about network interactions with various cloud service providers and external sources of data about cloud service providers, the enterprise may realize that the rules and policies previously defined can be improved. Thus, in step 206, the policy definition system can optionally allow modifications to different rules, different rules that make up a policy, and the order in which different policies are to be applied by the shadow rank calculation engine.

The policy database for the enterprise may receive a request from the shadow rank calculation engine for one or more of the policies. For example, if a communication between an enterprise user and an external network endpoint involves e-mail, then a first subset of policies may be requested by the shadow rank calculation engine. However, if the communication involves accessing a SaaS, then a different subset of policies may be requested by the shadow rank calculation engine. In step 208, the database provides the requested policies.

Figure 3:
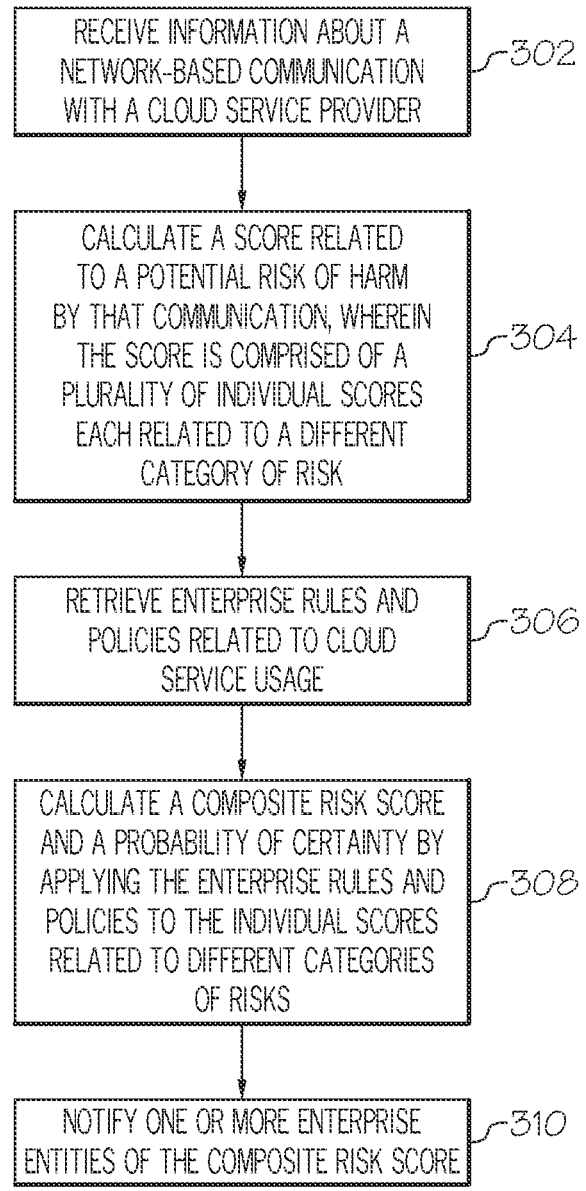
FIG. 3 illustrates a flowchart of an example risk analyzer in accordance with the principles of the present disclosure.

FIG. 3 illustrates a flowchart of an example risk analyzer in accordance with the principles of the present disclosure. In step 302, information about a network-based communication with an endpoint external to the enterprise network is received. For example, a central network traffic monitoring system of the enterprise can detect such communications within its traffic monitoring functionality. While all network communications can be analyzed, the monitoring system can initially make a determination whether or not the communication likely involves a cloud service provider and perform further shadow rank analysis only for those communications.

As an alternative, a software component on each enterprise user's computer can monitor outbound network communications and send those to a risk measurement system, wait for a risk assessment result, and then continue on with the network communication as normal. In this alternative, the user can be provided with an indication of the risk assessment result and voluntarily choose to abort any communications or be automatically blocked from continuing any such communications.

In either alternative, the risk measurement system, in step 304, calculates a score related to a potential risk of harm by the communication. In particular, that calculated score is comprised of a plurality of individual scores each related to a different category of risk. As mentioned above, example categories of risk include security exposure, virus exposure, data exposure, phishing exposure, site authenticity, site usage within an enterprise, knowledge about previous usage of a site from within the enterprise, and whether or not approval of a site has previously been determined. Thus, an aggregation system acquires a number of individual scores and assembles them into a score reflecting the potential risk of harm.

However, each enterprise can have different tolerance to risk and can have different tolerances to each of the different categories of risk that are included in the assembled score. Accordingly, in step 306, a shadow rank calculation engine retrieves enterprise rules and policies related to enterprise acceptance of particular risks with relation to cloud service usage or other risks. Once the rules and policies have been retrieved, the shadow rank calculation engine calculates, in step 308, a composite risk score by applying the enterprise rules and policies to one or more of the individual scores related to the different categories of risk. The "composite" score may be designed to hide the details of the individual scores and the complexity of the rules and guidelines of the enterprise. For example, the individual scores may be a variety of different numerical values and/or Boolean values while the rules may be organized into various polices in complex hierarchical decision trees that allow detailed determination of potential harm. However, the composite score may be as simple as assigning a communication into one of three categories such as "high risk", "medium risk", and "low risk". Additionally, the composite score can include a probability value (e.g. 66%) indicating a certainty that the categorization of the communication is accurate.

Once a communication has been received and evaluated, the shadow rank score can be communicated, in step 310, to one or enterprise entities using notification systems (e.g., email messaging, etc.) of the enterprise. The entity that is notified about the shadow rank may be an individual such as the user that initiated the communication that was analyzed, or the entity can be an automated data collection system that collects statistics about the network traffic of the enterprise.

The term "enterprise entity" can potentially encompass various people, accounts, devices or organizational units within an enterprise. Typically, an entity can be an individual, such as an employee or contractor, of the enterprise. An entity of an enterprise can also refer to an account (e.g., identified by login credentials) that is associated with a particular individual within the enterprise or an entity can refer to a particular device that is associated with an individual or organizational unit of the enterprise. In a broader sense, an entity can also refer to an organizational unit (e.g., department, building location, etc.) of an enterprise. For example, when a query for additional information is made to an entity that is believed to have utilized a cloud service, it may be sufficient in some instances to resolve the entity's identity to the "Finance Department" rather than specifically to "John Smith in the Finance Department". In other instances it may be beneficial to resolve the entity's identity to a particular individual of the enterprise or a specific device used by an individual of the enterprise.

Figure 4:
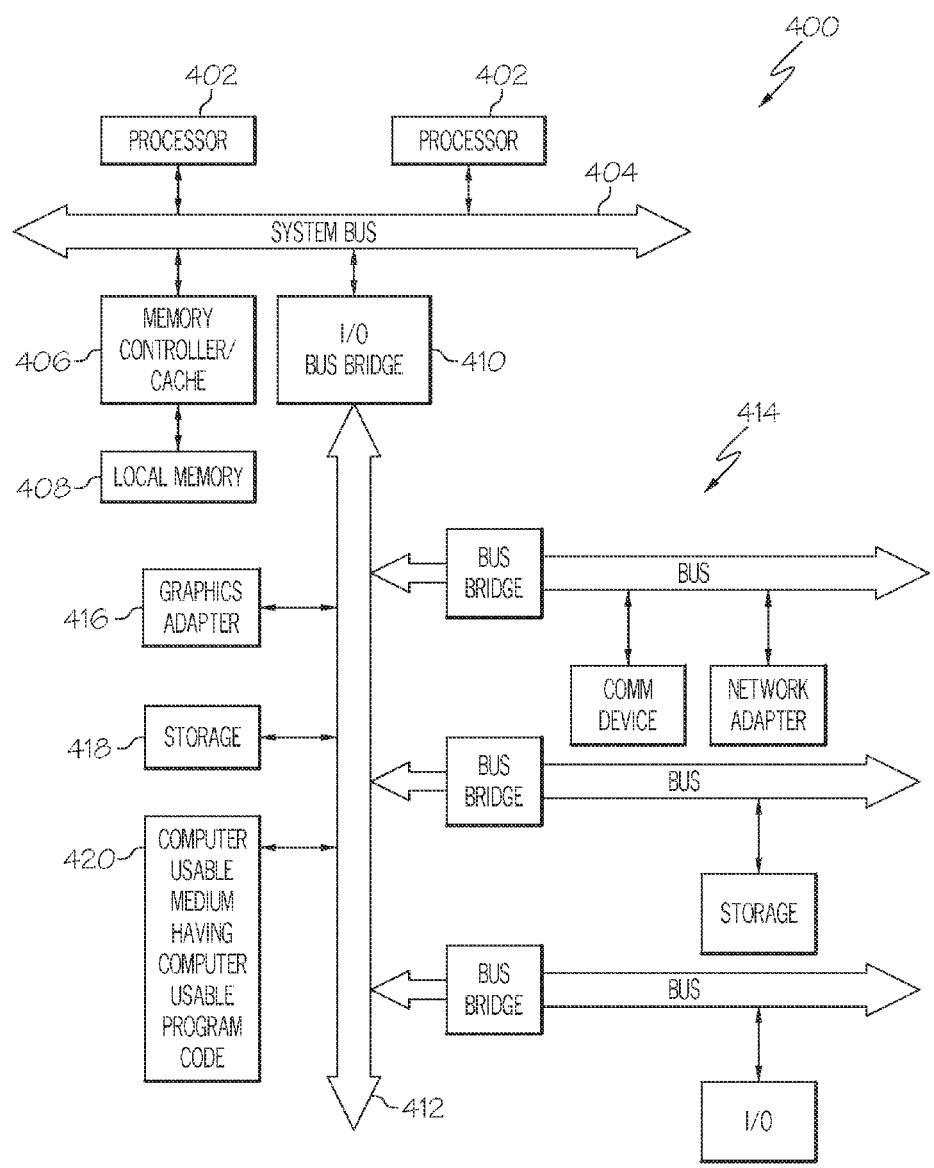
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 102 or aspects thereof, e.g., as set out in greater detail in FIG. 1-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of determining potential harm associated with a network endpoint external to an enterprise, comprising:
   receiving, by a computer, information about a network-based communication by a resource of the enterprise directed to the network endpoint external to the enterprise;
   calculating, by the computer, a plurality of individual scores related to a risk associated with the network-based communication,
      wherein each individual score corresponds to a different category of risk;
   receiving, by the computer, data specifying a policy related to rules defined by the enterprise regarding usage of cloud services;
   calculating, by the computer, a composite risk score related to the network-based communication,
      wherein the composite risk score is based on the individual scores and the policy, and
      wherein the composite score comprises a value and a probability indicative of a certainty of the value being an accurate measure of potential harm of the network-based communication; and
   notifying, by the computer, an entity of the enterprise about the composite risk score.

2. The method of claim 1, wherein the policy comprises a plurality of individual policies, each related to at least one of the different categories of risk.

3. The method of claim 1, comprising:
   receiving, by the computer, a plurality of policy definitions related to acceptable usage of cloud services; and
   based on the policy definitions, storing by the computer, the policy in a policy database.

4. The method of claim 1, wherein the composite risk score varies based on the policy such that one set of particular individual scores results in a different composite score depending on the policy.

5. The method of claim 1, comprising:
   preventing, by the computer, further network-based communication with the network endpoint external to the enterprise.

6. The method of claim 1, wherein one of the different categories of risk relates to a probability of security exposure.

7. The method of claim 1, wherein one of the different categories of risk relates to a probability of authenticity of the network endpoint external to the enterprise.

8. The method of claim 1, wherein one of the different categories of risk relates to a determination of previous usage of the network endpoint by the enterprise.

9. The method of claim 1, comprising:
   receiving, by the computer, information from a data source external from the enterprise,
      wherein the information from the data source relates to one of the different categories of risk; and
   calculating one of the individual scores based on the information from the data source.

10. A system for determining potential harm associated with a network endpoint external to an enterprise, comprising:
   a memory storage device;
   a processor configured to execute instructions stored in the memory storage device, the instructions when executed by the processor cause the system to:
      receive information about a network-based communication by a resource of the enterprise directed to the network endpoint external to the enterprise;
      calculate a plurality of individual scores related to a risk associated with the network-based communication,
         wherein each individual score corresponds to a different category of risk;
      receive data specifying a policy related to rules defined by the enterprise regarding usage of cloud services;
      calculate a composite risk score related to the network-based communication,
         wherein the composite risk score is based on the individual scores and the policy, and
         wherein the composite score comprises a value and a probability indicative of a certainty of the value being an accurate measure of potential harm of the network-based communication; and notify an entity of the enterprise about the composite risk score.

11. The system of claim 10, wherein the policy comprises a plurality of individual policies, each related to at least one of the different categories of risk.

12. The system of claim 10, wherein the instructions, when executed by the processor, cause the system to:
receive a plurality of policy definitions related to acceptable usage of cloud services; and
based on the policy definitions, store the policy in a policy database.

13. The system of claim 10, wherein the composite risk score varies based on the policy such that a set of particular individual scores results in a different composite score which depends on the policy.

14. The system of claim 10, wherein the instructions, when executed by the processor, cause the system to:
prevent further network-based communication with the network endpoint external to the enterprise.

15. The system of claim 10, wherein one of the different categories of risk relates to a probability of security exposure.

16. The system of claim 10, wherein one of the different categories of risk relates to a probability of authenticity of the network endpoint external to the enterprise.

17. The system of claim 10, wherein one of the different categories of risk relates to a determination of previous usage of the network endpoint by the enterprise.

18. The system of claim 10, wherein the instructions, when executed by the processor, cause the system to:
receive information from a data source external from the enterprise,
wherein the information from the data source relates to one of the different categories of risk; and
calculate one of the individual scores based on the information from the data source.

19. A computer program product for determining potential harm associated with a network endpoint external to an enterprise, comprising:
a non-transitory computer readable storage medium having computer readable program code embodied therewith, the computer readable program code comprising:
computer readable program code for receiving information about a network-based communication by a resource of the enterprise directed to the network endpoint external to the enterprise;
computer readable program code for calculating a plurality of individual scores related to a risk associated with the network-based communication,
wherein each individual score corresponds to a different category of risk;
computer readable program code for receiving a policy related to rules defined by the enterprise regarding usage of cloud services;
computer readable program code for calculating a composite risk score related to the network-based communication,
wherein the composite risk score is based on the individual scores and the policy, and
wherein the composite score comprises a value and a probability indicative of a certainty of the value being an accurate measure of potential harm of the network-based communication; and
computer readable program code for notifying an entity of the enterprise about the composite risk score.

* * * * *